(12) United States Patent
Jin

(10) Patent No.: US 8,238,724 B2
(45) Date of Patent: Aug. 7, 2012

(54) METHOD AND APPARATUS FOR PLAYING A MOBILE VIDEO PROGRAM

(75) Inventor: Sheng Jin, Shanghai (CN)

(73) Assignee: Koninklijke Philips Electronics N.V., Eindhoven (NL)

( * ) Notice: Subject to any disclaimer, the term of this patent is extended or adjusted under 35 U.S.C. 154(b) by 923 days.

(21) Appl. No.: 12/301,652

(22) PCT Filed: May 15, 2007

(86) PCT No.: PCT/IB2007/051829
§ 371 (c)(1),
(2), (4) Date: Nov. 20, 2008

(87) PCT Pub. No.: WO2007/135618
PCT Pub. Date: Nov. 29, 2007

(65) Prior Publication Data
US 2009/0201987 A1    Aug. 13, 2009

(30) Foreign Application Priority Data
May 24, 2006   (CN) .......................... 2006 1 0084489

(51) Int. Cl.
*H04N 5/76* (2006.01)
*H04N 7/173* (2006.01)
*H04N 7/08* (2006.01)

(52) U.S. Cl. ........ 386/292; 386/291; 386/294; 386/295; 386/297; 386/298; 386/299; 725/86; 725/94; 725/96; 725/99; 725/120; 725/121; 725/122; 725/123; 725/130; 725/140

(58) Field of Classification Search .................. 386/200, 386/201, 203, 210, 216, 219, 227, 291, 292, 386/294, 295, 297, 298, 299; 707/610, 611, 707/321, 322, 617, 642, 621, 622; 725/86, 725/94, 96, 99, 120, 121, 122, 123, 130, 725/140
See application file for complete search history.

(56) References Cited

U.S. PATENT DOCUMENTS

| | | | |
|---|---|---|---|
| 5,442,390 A * | 8/1995 | Hooper et al. ................. | 725/90 |
| 6,453,266 B1 * | 9/2002 | Chainer et al. ................ | 702/184 |
| 7,142,776 B2 * | 11/2006 | Tada .............................. | 386/206 |
| 7,499,232 B2 * | 3/2009 | Hodge et al. .................... | 360/60 |
| 7,603,022 B2 * | 10/2009 | Putterman et al. ............ | 386/291 |
| 7,646,435 B2 * | 1/2010 | Teichner et al. .............. | 348/616 |

FOREIGN PATENT DOCUMENTS

| | | |
|---|---|---|
| EP | 1505836 A1 | 2/2005 |
| EP | 1657928 A1 | 5/2006 |
| WO | 03005314 A1 | 1/2003 |
| WO | 2005004127 A1 | 1/2005 |

* cited by examiner

*Primary Examiner* — Daquan Zhao

(57) ABSTRACT

A method and apparatus for playing a mobile video program buffers program content received in real time when there is a considerable movement state change. After the movement state becomes stable, playing will be resumed. While playing is resumed, the buffered contents can be firstly played, including the playing manners such as skipping, fast forward, etc, and then a program content received in real time will be played after all the buffered contents have been processed. According to the mobile video playing method, both the user's requirement for the continuity of a program content and the user's viewing effect will not be influenced by a fierce change of movement state of the mobile video apparatus.

20 Claims, 2 Drawing Sheets

METHOD AND APPARATUS FOR PLAYING A MOBILE VIDEO PROGRAM

FIELD OF THE INVENTION

The present invention relates to mobile video technique, in particular to a method and apparatus for playing a mobile video program.

BACKGROUND OF THE INVENTION

Digital mobile television is an emerging media, following broadcast, television, news paper and Internet. It is supported by digital techniques, wherein television programs are played and received in a manner that they are transmitted by a wireless digital signal and digitally received on the ground.

On a moving vehicle, television signals can be received stably by digital mobile television technique to provide viewers with vivid television programs. Emerging Digital Video Broadcast-Handheld (DVB-H) supports mobile video multimedia service, and the popularization of mobile telephones becomes an advantaged condition for popularizing such a technique. TV-on-Mobile is a technique utilizing the mobile telephone terminal of mobile communication to view television programs in real time.

As mentioned above, the viewing effect will be influenced by a fierce change of movement state, although mobile television technique can ensure that effects of receiving and playing television programs will not be affected by movement state of vehicles or viewers.

OBJECT AND SUMMARY OF THE INVENTION

An object of the present invention is to provide a mobile video apparatus to reduce an impact on viewing effect due to a change of movement state.

According to an embodiment of the invention, a method of playing a mobile video program is provided for receiving and playing a video program, comprising the steps of: monitoring the change of said movement state, and outputting a monitor signal; comparing said monitor signal with a predetermined stop signal and a predetermined start signal; stopping playing, and buffering said program if said monitor signal is greater than said predetermined stop signal, in order that said program may be played during the period that said monitor signal is less than said predetermined start signal.

Said playing method further includes the steps of: judging whether there is any buffered program content if said monitor signal is less than said predetermined start signal; instructing to play said buffered program and buffer programs received in real time if there is any; and instructing to play the programs received in real time, if there is not any buffered program content.

Said predetermined stop signal and start signal maybe the same setting signal or different setting signals, for example, the predetermined stop signal is the one greater than the predetermined start signal. The comparison between said monitor signal and predetermined stop signal can be achieved by comparing the monitor signal at a certain moment with the predetermined stop signal. The comparison between said monitor signal and predetermined start signal can be achieved by comparing an average value of the monitor signal within a time period (e.g. 2 seconds) with the predetermined start signal.

According to an embodiment of the present invention, a mobile video apparatus is provided to receive and play a video program, the mobile video apparatus comprises: a monitor unit for monitoring a change of movement state and outputting a monitor signal; a comparison unit for comparing said monitor signal with a predetermined stop signal and a predetermined start signal; a buffer unit for buffering said program if said monitor signal is greater than said predetermined stop signal, in order that said program can be played during the period that said monitor signal is less than said predetermined start signal.

Said mobile video apparatus may further include: judgement unit for judging whether there is any buffered program content if said monitor signal is less than said predetermined start signal, and instructing to play said buffered program and said buffer unit buffer programs received in real time, if there is any; and instructing to play a program received in real time if there is not any buffered content.

If there is a considerable movement state change, such as a quick start or an abrupt stop of a vehicle, the mobile video apparatus will pause to play a program to guarantee the viewing effect. Received programs will be stored in the buffer unit in order not to miss any program transmitted in real time. After the movement state becomes stable, the mobile video apparatus will firstly play (including skipping, fast forward and normal playing, etc) the buffered content, and then play the program content received in real time after all the program contents in the buffer unit have been processed. A user may also directly view a program received in real time and leave the buffered content to be viewed in future.

A viewer's viewing effect will not be influenced by a fierce change of movement state with the mobile video apparatus and the method of playing a mobile video program provided by the present invention.

Other objects and achievements of the present invention will be apparent and a more complete understanding of the invention will be obtained from the following description made with reference to the accompanying drawings and claims of the invention.

DESCRIPTION OF DRAWINGS

The present invention will be further described in details through embodiments and with reference to accompanying drawings.

In all the above drawings, same reference signs represent the same, similar or corresponding features or functions.

SPECIFIC EMBODIMENTS

The concept of the invention is as follows: the received program content will be buffered where there is a considerable change in the movement state of the mobile video apparatus. After the movement state becomes stable, playing will be resumed. When playing is resumed, the buffered content can be played (including playing manners such as skipping, fast forward, etc) firstly, and then a received program will be played in real time after all program contents stored in the buffer unit have been processed.

Figure 1:
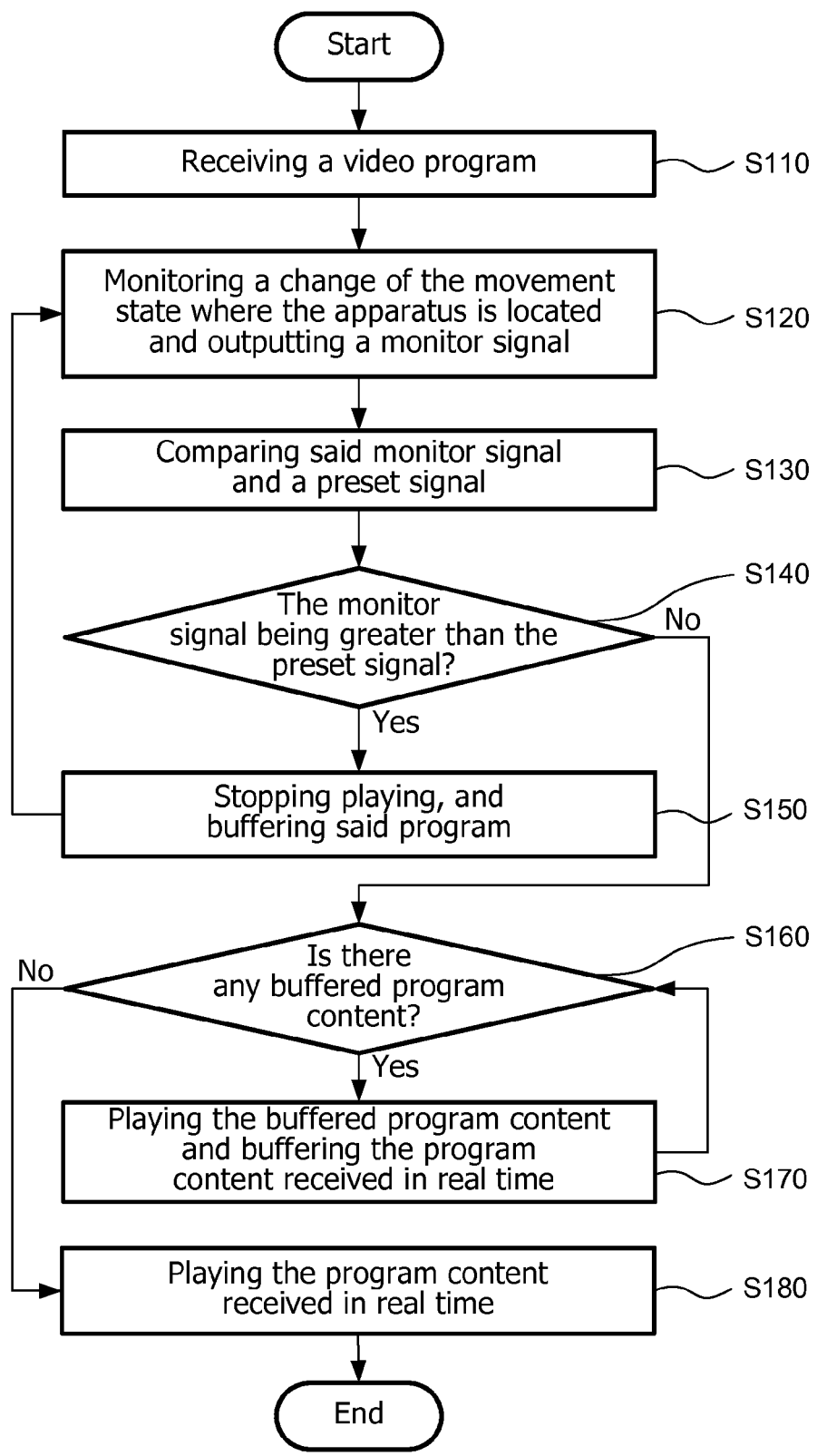
FIG. 1 is a flow chart of a mobile video playing method according to an embodiment of the invention.

FIG. 1 is a flow chart of a mobile video playing method according to an embodiment of the invention. Firstly, a mobile video program is received (step S110). The mobile video apparatus can receive a video program by a video broadcasting system, such as a Digital Video Broadcast-Handheld (DVB-H).

Movement state change is monitored and a monitor signal is outputted (step S120). A change of the movement state where a mobile video apparatus is located may be a fierce one caused by an abrupt stop of a vehicle, etc. The monitoring of the movement state change of a mobile video apparatus can be 3-dimensional, or if required, 2-dimensional or 1-dimensional. The monitoring can be carried out continuously, and a monitor signal can be output according to a set time interval or be output continuously.

Then, said monitor signal is compared with a predetermined stop signal and a predetermined start signal (step S130). In this example, the predetermined stop signal and the predetermined start signal are of the same set value, together referred to as predetermined signals. Predetermined signals can be set according to people's ocular physiological conditions, or set by a user on his/her own initiative according to his or her own ocular feeling. A standard for setting is that viewing effect of a mobile video apparatus will not be influenced by a movement state change.

If the predetermined start signal and the predetermined stop signal are of different values, and the stop signal is greater than the start signal, it is not necessary to compare the monitor signal with the start signal if the monitor signal is greater than the stop signal. Likewise, it is also not necessary to compare the monitor signal with the stop signal if the monitor signal is less than the start signal.

The monitor signal used to be compared with the predetermined stop signal may be a monitor signal output at a certain moment to ensure that a movement state change can be reacted quickly. The monitor signal used to be compared with the predetermined start signal may be an average value of the monitor signal within a time period before comparison so as to ensure that the change of said movement state is stable and will not be reacted mistakenly because the monitor signal at a certain instant is less than the predetermined start signal.

It is judged whether said monitor signal is greater than said predetermined stop signal (step S140). If the monitor signal is greater than said predetermined stop signal, it shows that the movement state change is fierce and has exceeded an endurable range and the playing effect cannot meet the viewing requirement already. If the program is played right along, users will get a bad viewing effect. If the monitor signal is not greater than said predetermined stop signal, the impact on the viewing effect caused by the movement state is still within a range acceptable to the user.

If the monitor signal is greater than said predetermined stop signal, playing is stopped and the program content received in real time is buffered (step S150). Playing the received program is stopped because the movement state change is already not suitable for viewing. At the same time, the program received in real time need to be buffered in order not to miss any program content because the program transmission of the mobile video broadcasting system is real time and consecutive.

In step S140, if the compare result is the monitor signal is less than the predetermined start signal, the mobile video apparatus may resume to play the program. Usually, a fierce movement state change of the mobile video apparatus will not last long, so the monitor signal will be back to a state that is less than the predetermined start signal after the movement state returns stable.

Before replaying the program, it is firstly judged whether there is any program content in a buffer state (step S160). The judgement can be carried out by a conventional method, for example, by means of some working parameters of the buffer unit.

If there is any buffered program content, it will be played first and at the same time, a program content received in real time is buffered (step S170). During the period that the buffered program is played, it can be ensured that the received program will not miss by buffering a program received in real time before the buffered content has been processed.

Playing the buffered program content includes skipping, fast forward, normal playing, etc. In the case that a user is not very interested in the buffered program, the user can choose to play it by skipping or fast forward. Such ways as fast forward and skipping may process the buffered program as soon as possible. If a user is not anxious to view the buffered content, the user can choose to play directly the program received in real time and leave the buffered program content for viewing in future.

If the playing of the buffered program is finished, the program content received in real time will be played (step S180) and no more received program content will be buffered.

According to the mobile video playing method provided by the invention, both a users' viewing effect and requirement for the continuity of a program content can be ensured and will not be influenced by a fierce movement state change.

Figure 2:
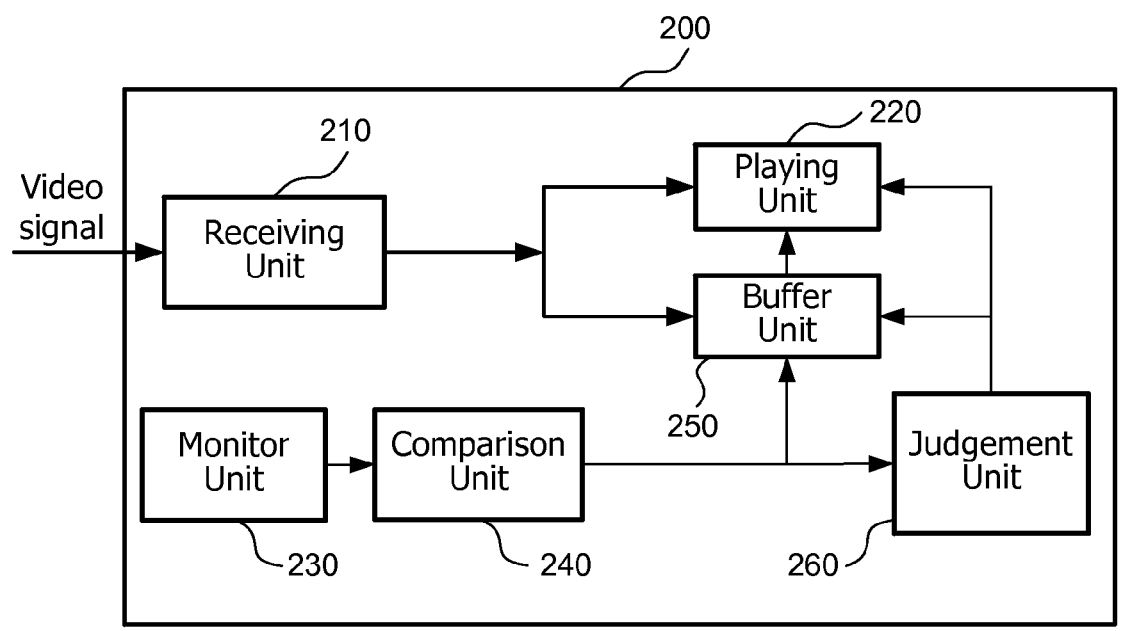
FIG. 2 is a schematic block diagram of a mobile video apparatus according to an embodiment of the invention.

FIG. 2 is a schematic block diagram of a mobile video apparatus 200 according to an embodiment of the present invention. As shown in this figure, the mobile video apparatus 200 includes receiving unit 210 for receiving a wireless video program, for example, receiving Digital Video Broadcast-Handheld (DVB-H), etc. The receiving unit 210 can still receive a video program normally in a movement state of the apparatus 200.

The apparatus 200 further includes playing unit 220 for playing a video program received by receiving unit 210. The playing unit 220 includes the capabilities of decoding and playing a received program.

The apparatus 200 further includes monitor unit 230 for monitoring a change in the movement state where the apparatus 200 is located and outputting a monitor signal. The monitor unit 230 can be an acceleration monitor unit for monitoring the change of the movement state in every direction, for example, it can be a 3-dimensional change, or a 2-dimensional or 1-dimensional change if required.

The apparatus 200 further includes comparison unit 240 for comparing said monitor signal with a predetermined stop signal and a predetermined start signal. In this example, the predetermined stop signal and the predetermined start signal are of the same set value, together referred to as predetermined signals. Predetermined signals can be set according to people's ocular physiological conditions, or set by a user on his/her own initiative according to his or her own ocular feeling. A standard for setting is the viewing effect of the mobile video apparatus will not be influenced by a movement state change. If the monitor signal is greater than said predetermined stop signal, which indicates that the viewing effect can't meet the user's requirement in such a movement state change.

The apparatus 200 further includes buffer unit 250 for buffering a program received by the unit 210 when the monitor signal is greater than the predetermined stop signal, in order that the program can be played during the period that the monitor signal is less than the predetermined start signal. A fierce movement state change will absolutely have an impact on the viewing effect, a user will miss a program content received or played during such period if the video playing apparatus is turned off or the program is played freely. During a fierce movement state change, the playing unit 220 will stop playing a program and the buffer unit 250 will buffer the program content received in real time.

If the compare result of the compare unit 240 tells that the monitor signal is less than said predetermined start signal, the playing unit 220 plays a program. The program to be played maybe a program buffered by the buffer unit 250 or a program received in real time by the receiving unit 210. A user can choose to play the buffered program or the program received in real time. The apparatus 200 can be configured in default that buffered programs will be played followed by the playing of programs received in real time after the playing of the buffered content is finished.

The apparatus 200 further includes judgement unit for judging whether there is any buffered content in the buffer unit 250 when the monitor signal is less than said predetermined start signal. If there is any, the playing unit 220 is instructed to play said buffered content, and the buffer unit 250 continues to buffer the program received in real time; if there is not any buffered program, the playing unit 220 is instructed to play the program content received in real time by said unit 210.

Playing a buffered program includes playing with normal speed, playing with fast forward, skipping, etc. If a user is not interested in the buffered content, fast forward or skipping can be employed; or otherwise, the buffered content can be played with a normal speed. Before all the buffered contents have been processed, received programs still need to be buffered to avoid missing. After the buffered programs have been played, the received programs need not to be buffered and can be played directly by the playing unit 220.

According to the mobile video apparatus provided by the invention, both users' viewing effect and users' requirement for the continuity of playing a program can be ensured.

Although the present invention has been described in combination with specific embodiments, it will be apparent to those skilled in the art that various replacements, modifications, and changes can be made according to the contents described previously, thus, all the replacements, modifications and changes should fall within the spirit and scope of the claims of the invention.

The invention claimed is:

1. A method of playing a mobile video program, for receiving and playing a video program, the method comprising the steps of:
    monitoring a change of a movement state, via an acceleration monitor unit, and outputting a monitor signal that is representative of the movement state change;
    comparing said monitor signal, via a comparison unit, with a predetermined stop signal and a predetermined start signal;
    stopping playing, and buffering said program, via a buffer unit, if said monitor signal is greater than said predetermined stop signal, in order that the program can be played, via a playing unit, during a period that said monitor signal is less than said predetermined start signal.

2. The method according to claim 1, wherein said monitoring of the movement state is carried out continuously.

3. The method according to claim 1, wherein said predetermined stop signal and said predetermined start signal are set according to a user's viewing effect.

4. The method according to claim 1, further comprising the steps of:
    judging whether there is any buffered program if said monitor signal is less than said predetermined start signal, and instructing to play said buffered program and buffer said program received in real time, if there is any.

5. The method according to claim 4, wherein said playing of said buffered program includes fast forward playing.

6. The method according to claim 4, wherein said playing of said buffered program includes skipping part of or all of said buffered program.

7. The method according to claim 4, wherein a program received in real time is played if there is not any buffered program.

8. The method according to claim 1, wherein said predetermined stop signal and said predetermined start signal are of the same setting signal value.

9. The method according to claim 1, wherein the monitor signal to be compared with said predetermined stop signal is a monitor signal at a specific moment.

10. The method according to claim 1, wherein the monitor signal to be compared with said predetermined start signal is an average value of the monitor signal within a specific time period.

11. A mobile video apparatus for receiving and playing a video program, comprising:
    an acceleration monitor unit for monitoring a change of said movement state and outputting a monitor signal that is representative of the movement state change;
    a comparison unit for comparing said monitor signal with a predetermined stop signal and a predetermined start signal; and
    a buffer unit for stopping playing, and buffering said program if said monitor signal is greater than said predetermined stop signal, in order that said program can be played during a period that said monitor signal is less than said predetermined start signal.

12. The video apparatus according to claim 11, wherein said monitoring of said movement state is carried out continuously.

13. The apparatus according to claim 11, wherein said predetermined signal is set according to a user's viewing effect.

14. The video apparatus according to claim 11, further comprising:
    judgment unit for judging whether there is any buffered program if said monitor signal is less than said predetermined start signal, and if there is any, instructing to play said buffered program and instructing said buffer unit to buffer the program received in real time.

15. The video apparatus according to claim 14, wherein said playing of said buffered program includes fast forward playing.

16. The video apparatus according to claim 14, wherein said playing of said buffered program includes skipping part of or all of said buffered program.

17. The video apparatus according to claim 14, wherein a program received in real time will be played by said playing unit if there is not any buffered program.

18. The mobile video apparatus according to claim 11, wherein said predetermined stop signal and said predetermined start signal are of the same setting signal value.

19. The mobile video apparatus according to claim 11, wherein the monitor signal to be compared with said predetermined stop signal is a monitor signal at a specific moment.

20. The mobile video apparatus according to claim 11, wherein the monitor signal to be compared with said predetermined start signal is an average value of the monitor signal within a specific time period.

* * * * *